H. E. T. HAULTAIN.
PROCESS OF REDUCING METALLIC OXID ORES.
APPLICATION FILED JUNE 30, 1908. RENEWED JULY 16, 1909.
950,595.
Patented Mar. 1, 1910.
2 SHEETS—SHEET 2.
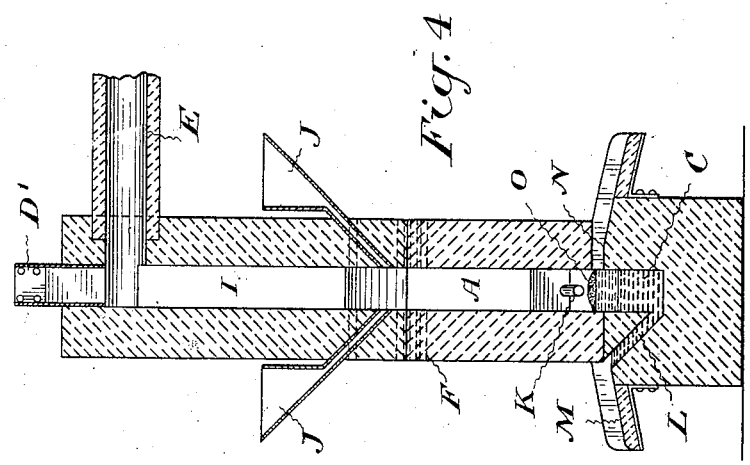
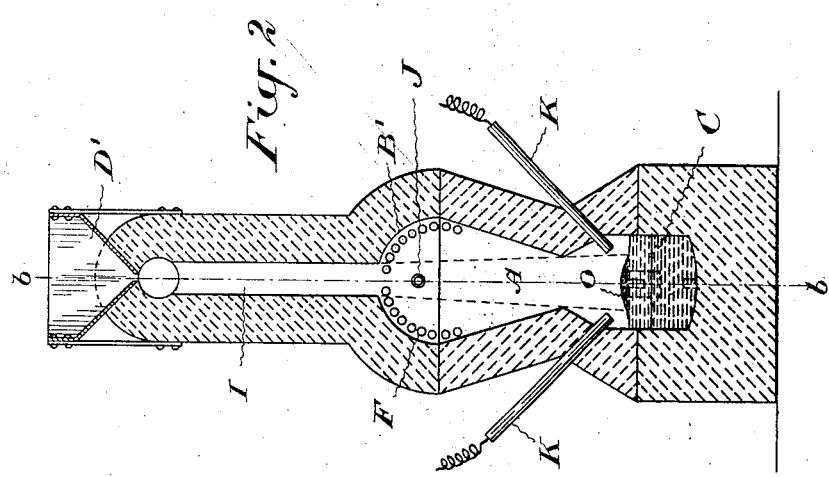

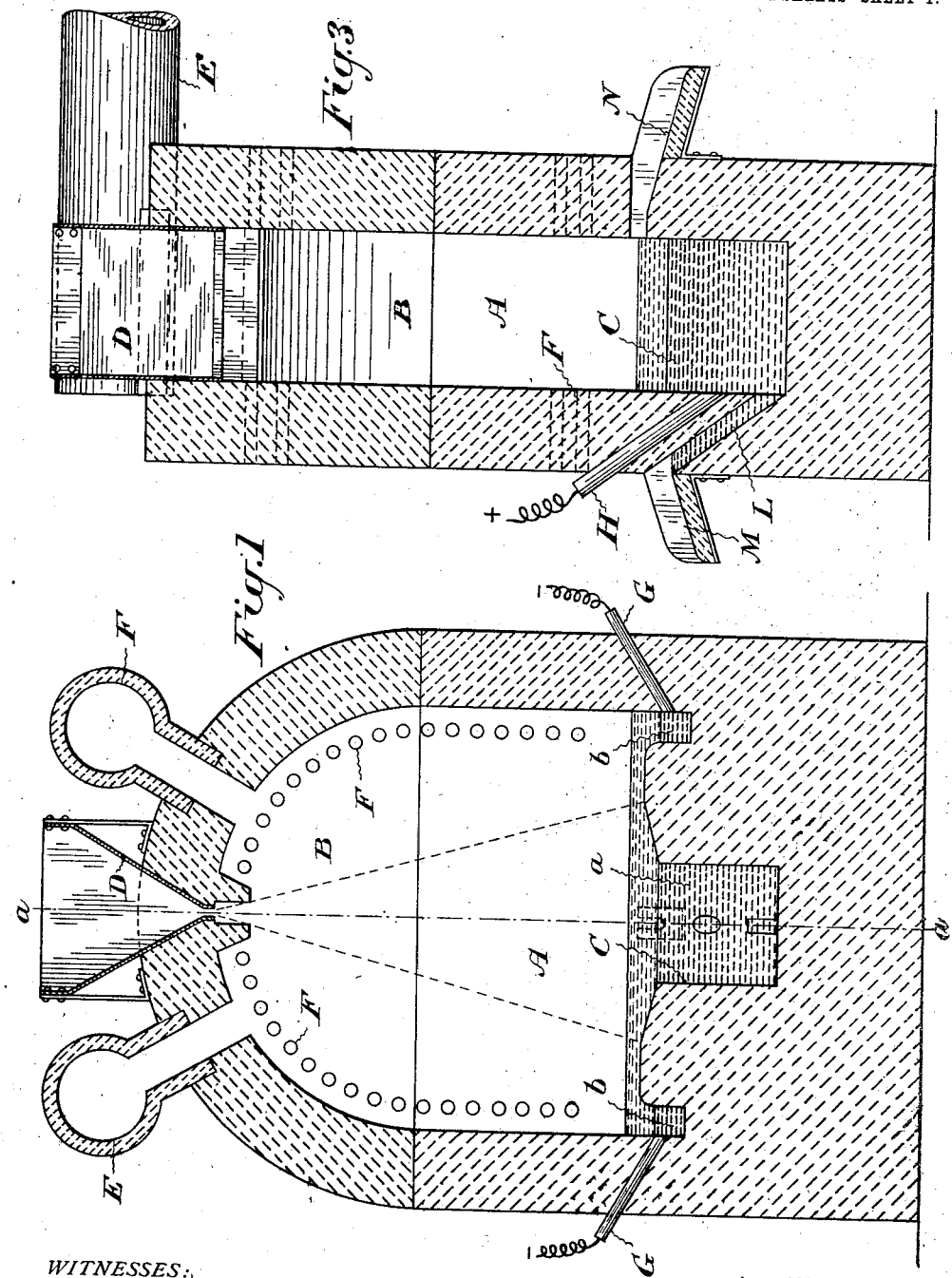

UNITED STATES PATENT OFFICE.

HERBERT E. T. HAULTAIN, OF TORONTO, ONTARIO, CANADA.

PROCESS OF REDUCING METALLIC OXID ORES.

950,595.  Specification of Letters Patent.  Patented Mar. 1, 1910.

Application filed June 30, 1908, Serial No. 441,088. Renewed July 16, 1909. Serial No. 508,005.

*To all whom it may concern:*

Be it known that I, HERBERT E. T. HAULTAIN, of the city of Toronto, county of York, Province of Ontario, Canada, have invented a certain new and Improved Process of Reducing Metallic Oxid Ores, of which the following is a specification.

This process relates to the reduction of metallic oxid ores and especially iron ores for the purpose of obtaining steel directly therefrom.

My object is to devise a process of reducing such ores by which they may be successfully treated in a finely divided condition and which is especially adapted for use with an electric furnace.

To obtain the best results as economically as possible with a finely divided showered ore, many requirements must be kept in view. In the first place to utilize as much of the potential heat as possible and to economize electrical energy, it is essential to prevent the escape of any carbon from the furnace in the form of carbon monoxid and to utilize electric energy as far as possible only for melting the smelted ore. Secondly, as the fine particles of ore rapidly become pasty when heated in a reducing atmosphere, it is important that the ore particles do not contact with any obstruction during reduction. Thirdly, in order to secure uniform results the newly smelted metal must be held in a heated bath in considerable quantity and only withdrawn gradually at a point remote from the place at which melting occurs so as to average up the inequality of its content of carbon and impurities due to unavoidable variations in the composition of the showered material as it reaches the bath. Fourthly, not only is a reducing atmosphere necessary but, to obtain the best results theoretically, solid carbon must be present at the final stage of the reduction just previous to melting, and particularly so if the product is to be cast iron or mild steel.

In carrying out my process I utilize an electric furnace having a receptacle of suitable capacity at the bottom to form a bath of molten material.

The ore if not already in the condition of magnetic iron sands is crushed or ground in a finely divided condition. The ore is then treated in a concentrator to separate as far as possible its earthy components. The ore is then so fed into the furnace preferably mixed with a suitable powdered flux so as to produce a shower of discrete particles, in which condition the ore is most readily permeable by the reducing agents and is most readily heated. The furnace is so arranged that the ore meets with no obstructions from the time it enters the furnace until it reaches the surface of the bath at the bottom. This bath is suitably heated, preferably by electric energy. Into the shower of finely divided ore, preferably intermediate its point of entry into the furnace and the surface of the bath, I introduce a shower of carbon, also in a finely divided condition. Carbon monoxid is immediately produced by the combination of the carbon with the oxygen of the ore, which carbon monoxid promptly takes up more oxygen from the ore and becomes carbon dioxid, which in turn takes up carbon and is reduced to carbon monoxid again. This process takes place all through the shower. It has been determined by experimentalists that carbon monoxid alone tends only to partially deoxidize the ore and that the best results are obtained by having solid carbon present with the ore to complete the deoxidation. By my process it will be seen that the carbon being actually present in the shower in a solid condition is ready to hand for combination with the finely divided particles of ore which have been partially deoxygenized by the reducing atmosphere supplied by the carbon monoxid. There is necessarily a surplus of carbon employed and a consequent surplus of carbon monoxid produced, which must not be allowed to escape and its heating value lost. At the same time air cannot be introduced into the ore shower after its mixture with carbon to effect this combustion as the formation in the ore shower of carbon dioxid instead of monoxid would result. I therefore shape the lower portion of the furnace so that it extends laterally on each side of the shower and into this portion of the furnace I introduce air which combines with more or less of the surplus carbon monoxid, producing an intense heating effect which is reverberated against the shower and the surface of the bath of molten material by the walls of the chamber which are suitably shaped to produce the reverberating effect. It will be seen that this air does not contact in any manner with the shower of ore and carbon and it is therefore usefully employed without producing any deleterious effects. It is preferable that only a portion of the surplus carbon monoxid be employed in this manner, the remainder being allowed to pass up through the ore shower to a point above the carbon feed. Here a further supply of air is introduced into the furnace which combines with the remaining carbon monoxid and produces a heat sufficient to subject the ore to a preliminary calcination, which burns off a proportion of its impurities and gives it a preliminary heating sufficient to raise it to a temperature to greatly facilitate the chemical reactions in the reducing zone of the furnace.

The re-actions which take place are as follows:—The showered ore is first calcined and heated as described and after it has passed the calcining portion of the furnace, enters a reducing atmosphere due to the introduction of the showered carbon. By the joint action of the carbon monoxid and the solid carbon the ore is deoxidized and falls into the bath of molten material in the condition of pasty metallic particles mingled with slag. In the bath at or, adjacent to, its surface, the metal is melted and the slag separates collecting on the surface of the bath. This bath has a sufficient capacity to contain a considerable proportion of the daily output of the furnace, and the molten metal is withdrawn from the bath gradually and preferably continuously to a point remote from the place in which the smelting occurs, preferably at the bottom of the bath. This withdrawal is best effected by carrying a suitable conduit from the bottom of the receptacle up to the level of the bath exterior to the furnace. Through this conduit the metal gradually flows off to suitable receptacles. This retaining of the molten metal and its gradual withdrawal equalized any inequalities in the output, which is very important since the proportion of carbon and impurities to the pure metal may be subject to variations owing to its being continuously produced in small quantities.

The process is preferably carried out in a furnace such as is shown in the accompanying drawings in which:—

Figure 1 is a vertical section of a simple form of furnace, Fig. 2 a similar view of an elaborated form of furnace. Fig. 3 is a vertical section on the line $a$—$a$ Fig. 1, and Fig. 4 a section on the line $b$—$b$ Fig. 2.

In the drawings like letters of reference indicate corresponding parts in the different figures.

Referring particularly to Figs. 1 and 3, A is the furnace provided with an arched top B. C is the bath for the molten material. D a hopper through which the ore mingled with powdered carbon is showered. E pipes for the exit of waste gases and F air inlet pipes. The bottom of the bath in this form of furnace is provided with a central depression $a$ and two smaller lateral depressions $b$. Into the lateral depressions are led two negative electrodes G and into the central depression a positive electrode H. These electrodes may be of any suitable material except carbon. The passage of the current through the molten metal and slag provides the necessary heat for melting the metal and for facilitating the chemical re-actions. The air pipes F being entirely outside the shower (the fall of which is indicated by dotted lines) combines with carbon monoxid without interfering with the reduction of the ore and the heat produced is reverberated against the shower and the surface of the bath. In this form of furnace it will be noted that there is no introduction of oxygen above the inlet point of the carbon and no preliminary calcination takes place.

In the form shown in Figs. 2 and 4, the ore is introduced through a hopper $D^1$ and falls through the tubular passage I before it reaches the reverberating top $B^1$ of the reducing portion of the furnace. Through the sides of this chamber the powdered carbon is introduced through the pipes J. The air inlets F, it will be seen, are extended above the point at which the carbon enters, consequently not only is a proportion of the surplus carbon monoxid burned outside the shower in the reducing zone of the furnace but any remaining carbon monoxid is burned in the showered ore before the latter is mingled with carbon to effect the preliminary calcination of the ore. In this form I also show an alternative method of heating the bath of molten material by electric energy. Two electrodes K are led in through the opposite sides of the furnace so that arcing will take place between the ends of the electrodes and the surface of the slag, or partly melted metal and slag, formed where the shower strikes the surface of the bath.

In each furnace the metal is withdrawn by means of a conduit L extending outward and upward from the bottom of the bath and provided with a spout M, and in each furnace an overflow N is provided for the slag slightly above the upper end of the conduit L.

I have described the shower as falling directly into the bath of the molten material. As there may be at times a small island O of partly melted metal and slag accumulated on the surface of the bath directly under the shower, this expression must not be taken to mean that in all cases the smelted metal falls directly into the completely molten metal and slag but only that it falls directly from its point of entry into the furnace to the bath of molten material without coming into contact with any cross surfaces or obstacles which would inevitably clog with semi-reduced ore or metal in a pasty condition. It must also be noted that though the ore is preferably showered certain features of the process are of great value when the ore is handled in any other manner, notably the burning of surplus carbon monoxid in the reducing chamber but remote from the ore.

What I claim as my invention is:—

1. A process of reducing metallic oxid ores which consists in showering finely divided ore through an unobstructed chamber containing a heated reducing gas directly into a bath of the molten material heated by electric energy, and burning surplus reducing gas in the reducing chamber outside the ore shower.

2. A process of reducing metallic oxid ores which consists in showering finely divided ore through an unobstructed chamber containing a heated reducing gas directly into a bath of the molten material heated by electric energy, and burning surplus reducing gas in the reducing chamber outside the ore shower and reverberating the heat so produced inward and downward.

3. A process of reducing metallic oxid ores which consists in passing ore through a reduction chamber containing a reducing gas and burning surplus reducing gas in the reducing chamber outside the ore.

4. A process of reducing metallic oxid ores which consists in showering finely divided ore through a reduction chamber containing a reducing gas and burning surplus reducing gas in the reducing chamber outside the ore shower.

5. A process of reducing metallic oxid ores which consists in showering finely divided ore through a reduction chamber containing a reducing gas and burning surplus reducing gas in the reducing chamber outside the ore shower and reverberating the heat so produced inward and downward.

6. A process of reducing metallic oxid ores which consists in showering finely divided ore through a chamber containing a heated reducing gas directly into a bath of molten metal heated by electric energy and introducing pulverized carbon into the shower intermediate the surface of the bath and the point of introduction of the ore.

7. A process of reducing metallic oxid ores which consists in showering finely divided ore and carbon through a chamber containing a heated reducing gas directly into a bath of molten metal heated by electric energy and burning the surplus reducing gas in the reducing chamber outside the ore shower.

8. A process of reducing metallic oxid ores which consists in showering finely divided ore through a chamber containing a heated reducing gas directly into a bath of molten metal heated by electric energy, introducing pulverized carbon into the shower, burning surplus reducing gas in the reducing chamber outside the ore shower, and reverberating the heat so produced inward and downward.

9. A process of reducing metallic oxid ores which consists in feeding the ore through a furnace in a shower of discrete particles to a heated bath at the bottom, introducing carbon in a similar condition at a lower point but above the bath whereby carbon monoxid is generated in the shower and permeates the showered materials alternately combining with oxygen from the ore and with the carbon, and introducing air outside the shower to combine with surplus carbon monoxid to increase the heating effect in the furnace.

10. A process of reducing metallic oxid ores which consists in feeding the ore through a furnace in a shower of discrete particles to a heated bath at the bottom, introducing carbon in a similar condition at a lower point but above the bath whereby carbon monoxid is generated in the shower and permeates the showered materials alternately combining with oxygen from the ore and with the carbon, introducing air outside the shower to combine with surplus carbon monoxid to increase the heating effect of the furnace, and introducing air above the carbon inlet to combine with surplus carbon monoxid to produce heat to calcine the showered ore.

11. A process of reducing metallic oxid ores which consists in feeding the ore through a furnace in a shower of discrete particles to a heated bath at the bottom, introducing carbon in a similar condition at a lower point but above the bath whereby carbon monoxid is generated in the shower and permeates the showered materials alternately combining with oxygen from the ore and with the carbon, and introducing air outside the shower and above the carbon shower to combine with surplus carbon monoxid to increase the heating effect of the furnace.

12. A process of reducing metallic oxid ores which consists in feeding the ore through a furnace in a shower of discrete particles to a heated bath at the bottom, introducing carbon in a similar condition at a lower point but above the bath whereby carbon monoxid is generated in the shower and permeates the showered materials alternately combining with oxygen from the ore and with the carbon, and introducing air in a reverberating chamber outside the shower to combine with surplus carbon monoxid to increase the heating effect of the furnace.

13. A process of reducing metallic oxid ores which consists in feeding the ore through a furnace in a shower of discrete particles to a heated bath at the bottom, introducing carbon in a similar condition at a lower point but above the bath whereby carbon monoxid is generated in the shower and permeates the showered materials alternately combining with the oxygen from the ore and with the carbon, and introducing air outside the shower adjacent to the bath to combine with surplus carbon monoxid to increase the heating effect of the furnace.

14. A process of reducing metallic oxid ores which consists in continuously showering finely divided ore through an unobstructed chamber directly into a bath of the molten material heated by electric energy, introducing pulverized carbon into the shower intermediate the surface of the bath and the point of introduction of the ore, and gradually withdrawing the molten metal from the bath at a point sufficiently remote from the shower to avoid the immediate withdrawal of the newly smelted metal.

15. A process of reducing metallic oxid ores which consists in feeding the ore through a furnace in a shower of discrete particles to a heated bath at the bottom, introducing carbon in a similar condition at a lower point but above the bath whereby carbon monoxid is generated in the shower and permeates the showered materials alternately combining with the oxygen from the ore and with the carbon and introducing air into the shower above the carbon to combine with surplus carbon monoxid to effect a preliminary calcination of the ore.

Dated at the city of Toronto, Province of Ontario, Canada, this 20th day of June, A. D. 1908.

HERBERT E. T. HAULTAIN.

In the presence of—
J. EDW. MAYBEE,
JOHN G. RIDOUT.